(12) United States Patent
Koch

(10) Patent No.: US 6,450,229 B1
(45) Date of Patent: Sep. 17, 2002

(54) COMPACT DISK LABELING SYSTEMS

(75) Inventor: Richard C. Koch, Rancho Santa Margarita, CA (US)

(73) Assignee: Labelwhiz.com, Inc., Rancho Santa Margarita, CA (US)

( * ) Notice: Subject to any disclaimer, the term of this patent is extended or adjusted under 35 U.S.C. 154(b) by 77 days.

(21) Appl. No.: 09/661,672

(22) Filed: Sep. 14, 2000

Related U.S. Application Data

(63) Continuation-in-part of application No. 09/409,632, filed on Oct. 1, 1999.

(51) Int. Cl.[7] ............................... B65C 1/00; B65C 1/02
(52) U.S. Cl. ..................... 156/391; 156/556; 156/579; 156/580; 206/308.1
(58) Field of Search ................................ 156/391, 556, 156/580, 574; 206/308.1, 224, 232; 425/318

(56) References Cited

U.S. PATENT DOCUMENTS

| | | | | |
|---|---|---|---|---|
| 5,715,934 A | * | 2/1998 | Tobol et al. ................. | 206/232 |
| 5,951,819 A | * | 9/1999 | Hummell et al. ............ | 156/556 |
| 6,302,176 B1 | * | 10/2001 | Chen .......................... | 156/391 |

FOREIGN PATENT DOCUMENTS

| | | | | |
|---|---|---|---|---|
| DE | 29701108 U1 | * | 4/1997 | ............. B65C/1/02 |
| DE | 29817456 U1 | * | 12/1998 | ............. B65C/1/02 |
| DE | 298 17 456 U1 | * | 12/1998 | ............. B65C/1/02 |
| EP | 0855713 A1 | * | 7/1998 | ........... G11B/23/40 |

OTHER PUBLICATIONS

English Translation for De 297 01 108 U1.*
English Translation for EP 0 855 713 A1.*

* cited by examiner

*Primary Examiner*—Richard Crispino
*Assistant Examiner*—Sue A. Purvis
(74) *Attorney, Agent, or Firm*—Kenneth W. Float

(57) ABSTRACT

Compact disk labeling systems for use in applying a compact disk label to a compact disk. One embodiment includes a compact disk case with a base and a rotatable lid that rotates about a hinge. A central spindle protrudes from a surface of the base that holds the compact disk by means of its central hole. A label hub protrudes from a surface of the lid. A flexible foam disk may be attached to an interior surface of the lid that is disposed around the label hub. Another embodiment includes a base having a generally flat upper surface. A central spindle protrudes slightly above the upper surface of the base that holds the compact disk by means of its central hole. A rotatable lid is attached to the base by means of a hinge and has a generally flat surface 23 with an inner tab section and an outer section that flex relative to each other. A cylindrically-shaped compact disk label hub protrudes from the inner tab section to hold the adhesive label. In another embodiment of the system, the compact disk is held by means of an outer edge holding mechanism instead of the central hub The outer edge holding mechanism may be provided by a plurality of bosses or tabs, a single circular lip or recess, or portions of a circular lip.

13 Claims, 4 Drawing Sheets

COMPACT DISK LABELING SYSTEMS

This application is a continuation-in-part of Ser. No. 09/409,632 filed on Oct. 1, 1999.

BACKGROUND

The present invention relates generally to compact disk labeling systems for use in applying an adhesive label to a non-readable surface of a compact disk.

A number of patents have been issued relating to compact disk labeling systems for applying compact disk labels. These include U.S. Pat. Nos. 5,421,950, 5,783,033, 5,783,031, 5,902,446, and European Patent No. 0855713.

U.S. Pat. No. 5,421,950 discloses an applicator tool for adhering a gummed label to a circular disk in concentric alignment with a center hole through the disk. The applicator tool has a blade portion and a handle portion. An alignment hub having a raised circular shoulder is disposed on one side of the blade portion and a projecting hub is disposed on the other blade surface. The shoulder and hub are aligned along an axis and the hub and are sized for insertion into the disk center hole.

U.S. Pat. No. 5,783,033 discloses a compact disc labeling device for manually applying a label to a compact disc. The device includes an assembly having a circumferential flange with an upper flange surface, a piston, a first rod having a diameter approximately equal to the diameter of the label's central aperture and that extends from the upper surface of the piston, and a second rod having a diameter approximately equal to the diameter of the disc's central aperture and that extends from the first rod. In use, a label is placed on the flange with the first rod projecting through its central aperture and the disc positioned on the second rod through its central aperture. When the piston is moved from an upper first position to a lower second position, the disc is applied to the label.

U.S. Pat. No. 5,783,031 discloses a device and a process for applying a label to a compact disk. The device is comprised of a two-level base with a post in the center of the base. A compact disc is slipped over the post and rests on the upper level of the base. A cap is then placed over the post which allows an annular paper label to be centered on the disc.

U.S. Pat. No. 5,902,446 discloses a labeler for manually placing self-adhesive labels onto compact disks. The labeler has a positioning cone with an elongated stock member, a flat surface with a diameter greater than that of the elongated stock member, and a point on an end of the positioning cone opposed from the elongated stock member. The labeler also has a positioning plate with a positioning hole in the center, a surface area upon which a self-adhesive label can be placed and a side area to add strength to the positioning plate. The labeler further has a cylindrical base with a flat lip member upon which the positioning plate can rest substantially flat, a flat bottom to keep the cylindrical base substantially flat when used on a substantially flat surface, a wall to keep the flat lip member lifted substantially off of the substantially flat surface and a hollow cavern into which a substantial portion of the positioning cone can fit.

European Patent No. 0855713 discloses a device having a sleeve with a reception element for the compact disc. A fixing element positions the compact disc and a cover element which is pivoted to the reception element and provided with a carrier element for a label on its inside. The carrier element has an adhesive layer for temporarily securing the label and is secured to the inside of the cover element via an adhesion element, with transfer of the label to the surface of the compact disc, upon closure of the sleeve.

The device disclosed in European Patent No. 0855713 has a sticky surface that holds the label prior to contact with the CD. The label is placed by hand around a target circle to locate the label, and the sticky surface holds the label, and then the lid is closed to apply the label to the CD. The is no central hub that holds the label, and there is no concentric foam disk in the device disclosed in European Patent No. 0855713.

Companies by the name of Stomper and Press-it market almost identical label applicators, and these applicators function in a manner similar to the device disclosed in U.S. Pat. No. 5,902,446, although they are made differently. The Stomper and Press-it devices have a base with a surface that holds an adhesive-backed label with the adhesive surface facing upward. A spring loaded central alignment member has a larger diameter lower portion, whose diameter matches that of the label. An upper portion has a smaller diameter that matches the diameter of the opening in the CD. The CD is placed over the upper portion and rests on a shelf (or shoulder region per U.S. Pat. No. 5,902,446) formed between the upper and lower portions of the alignment member. The CD is pressed downward against the tension of the spring, forcing the alignment member downward until the CD contacts the adhesive surface of the label.

Dynosys AG markets a Labelle™ CD labeling system. This system has a bottom casing (or base) containing a centered depressible knob referred to as a movable swimming centering knob. A lid that closes on the bottom casing contains a CD hub and a depressible button that moves the hub and CD towards the bottom casing. A label is placed in the casing bottom, and the movable swimming centering knob automatically aligns with the top centering core when the lid is closed. This aligns the label with the CD. When the lid is closed on the bottom casing and the depressible button in the center of the lid is pressed, the CD-ROM is lowered onto the aligned label disposed in the bottom casing. The movable swimming centering knob in the bottom casing is moved below the label when the depressible button in the center of the lid is pressed to contact the CD with the label.

It is an objective of the present invention to provide for improved compact disk labeling systems for use in applying an adhesive label to a readable surface of a compact disk.

European patent application No. EP 0855712 A1 published on Jul. 29, 1998 discloses apparatus for use in applying labels (30) to storage disks (40) such as CDs or CD-ROMs using printable or unprinted writable or unwritten labels that are round and have a central opening (41). A device (100) is disclosed consisting of a bottom piece (10) with a vertical, first receiving rod (15) for accepting, holding and centering the storage disk and a cover piece (20) matching the bottom piece. A second vertical rod (25) is attached in a spring-like fashion to the cover piece (20) for accepting, holding and centering the adhesive label (30) having an adhesive surface (32) facing the bottom piece. In the closed and pressed together condition of the bottom piece and cover piece, the two receiving rods (15, 25) take on a coaxial position and the label is pressed on to the storage disk surface, while concurrently the second vertical rod for the label is springing back. This label attachment device thus secures both the label and the storage disk by means of their respective central openings.

SUMMARY OF THE INVENTION

To accomplish the above and other objectives, the present invention provides for compact disk labeling systems that easily apply an adhesive label to a readable surface of a compact disk (CD). One embodiment of the compact disk labeling system is a device that comprises a standard CD jewel case having a base and a lid. A plastic insert is secured to the base and includes a central spindle that holds the CD by means of its central hole. The plastic insert has a circular depressed area in which CD sits when secured by the central spindle. A CD label hub and a concentric foam disk are attached to the lid of the CD jewel case. The CD label hub has a central opening into which the central spindle sits when the lid is closed. The central opening in the CD label hub is larger in diameter than the central spindle and there is no contact between them. The CD label hub is sized so that the central opening of the CD label is secured by it.

To operate the device, a CD is secured in the plastic insert with its central hole secured by the spindle. A CD label is pressed over the CD label hub so that its back side touches the concentric foam disk and its adhesive surface is exposed. The lid is closed, and the concentric foam disk presses the adhesive surface of the CD label onto the surface of the CD, thus securing the label to the CD.

Another embodiment of the compact disk labeling system is a device that comprises a base and a rotatable lid attached to the base by means of a living hinge or other flexible member. The lid is substantially flat and has a U-shaped slot extending away from the hinge that forms a "U" around the center of the lid. By virtue of the U-shaped slot, the lid has an inner elongated tab section and an outer U-shaped section. A thin walled cylindrically-shaped CD label hub with a portion of the wall removed extends away from the surface of the U-shaped flexible member into the interior of the device when the lid is closed on the base. A CD label is held by the CD label hub against the U-shaped section with its printed side lying against the surface of the lid and adhesive surface exposed.

The base has a substantially flat upper surface that has edgewalls that extend away from the upper surface to create a cavity below the device when it sits on a flat surface. The upper surface has a central circular opening that generally aligns with the CD label hub when the when the lid is closed on the base. A portion of the upper surface is formed as a tab that extends into the center of the central circular opening. A spindle that holds a compact disk is formed as part of the tab and is aligned with the center of the cylindrically-shaped hub.

The cylindrically-shaped hub extending from the U-shaped elongated tab section is sized to pass into the central circular opening when the lid is closed on the base for storage purposes. The tab fits in the removed portion of the cylindrically-shaped hub when the lid is closed on the base for storage purposes.

To operate the device, a CD is disposed on the base with its central hole secured by the spindle. A CD label is pressed over the CD label hub so that its printed side lies against the surface of the lid and its adhesive surface is exposed. The lid is closed so that the CD label hub touches the center of the CD. The outer U-shaped section of the lid is then fully closed on the base to press the adhesive surface of the CD label onto the surface of the CD, thus securing the label to the CD.

In another embodiment of the system, the compact disk, and optionally a mini compact disk, is held by means of an outer edge holding mechanism instead of a central hub. The outer edge holding mechanism may be provided by a plurality of bosses or tabs, a single circular lip or recess, or portions of a circular lip.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which.

DETAILED DESCRIPTION

Figure 1:
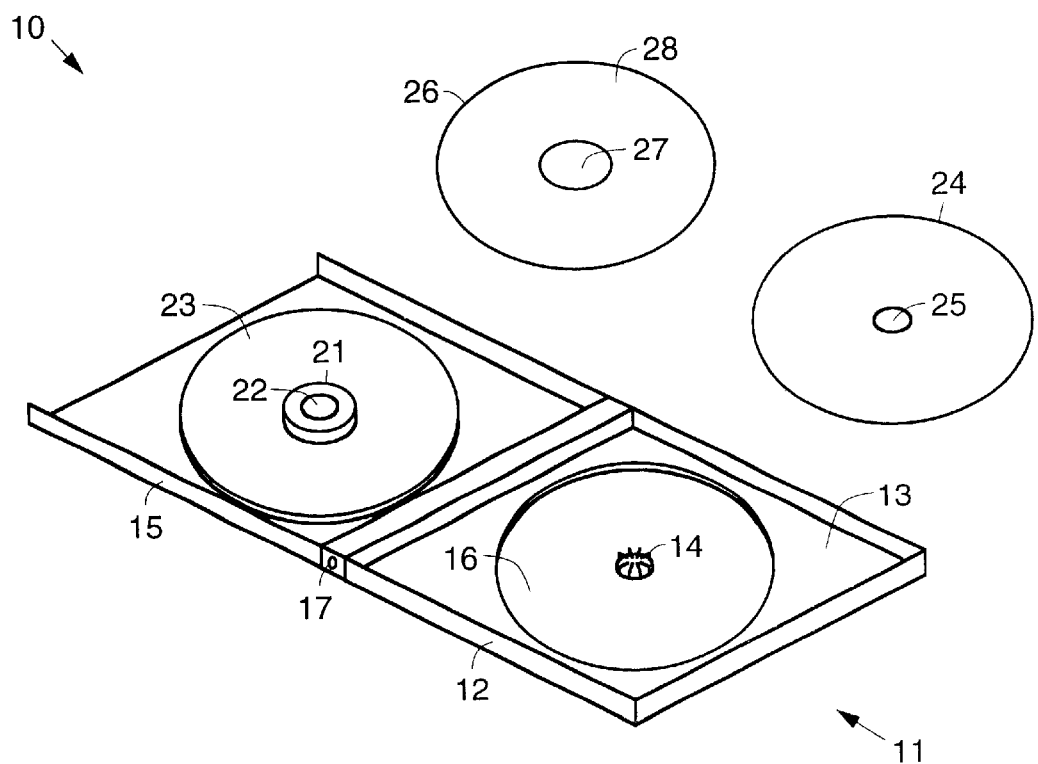
FIGS. 1–5 illustrate various views and operation of a first exemplary embodiment of a compact disk labeling system in accordance with the principles of the present invention.
Figure 2:
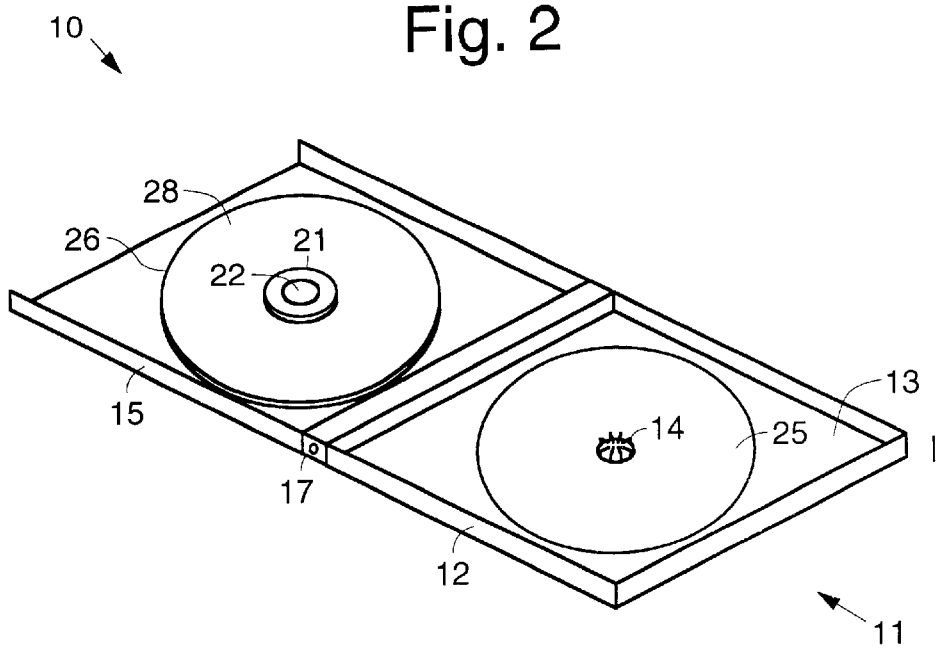
Figure 3:
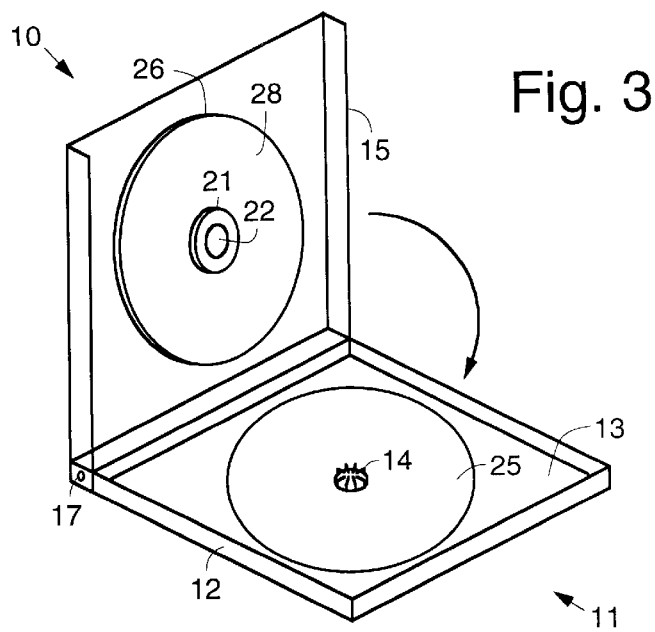
Figure 4:
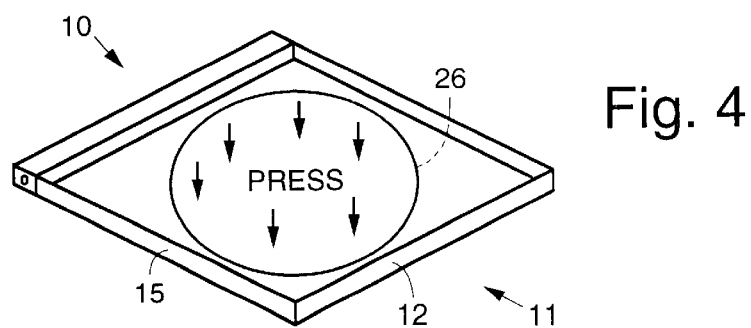
Figure 5:
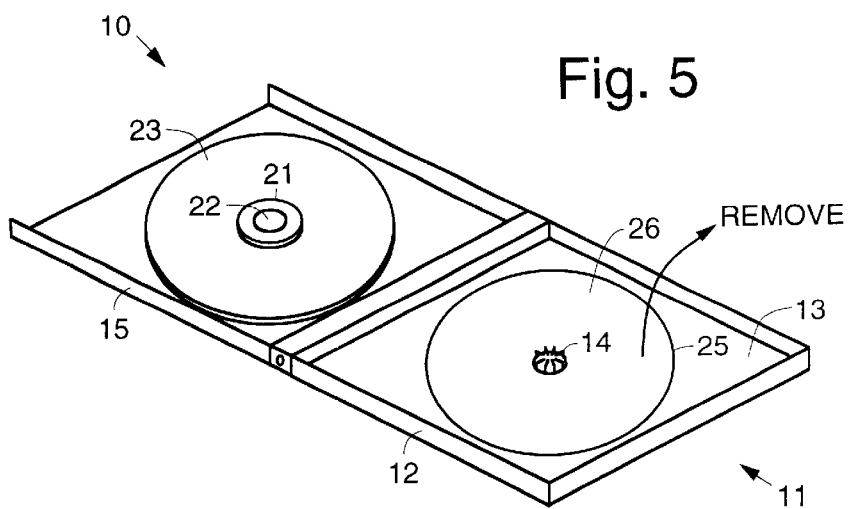

Referring to the drawing figures, FIGS. 1–5 illustrate various views and operation of a first exemplary compact disk labeling system 10 in accordance with the principles of the present invention. FIG. 1 shows an open labeling system 10 and a compact disk (CD) 24 and CD label 26 that are used with it. FIG. 2 shows the compact disk 24 and CD label 26 disposed in the labeling system 10. FIG. 3 shows closing of the labeling system 10. FIG. 4 shows the labeling system 10 in a closed condition where the CD label 26 is secured to the compact disk 24. FIG. 5 shows removal of the labeled CD 14 from the labeling system 10.

Referring to FIG. 1, the first exemplary compact disk labeling system 10 may comprise a case 11, such as a standard compact disk jewel case 11 having a base 12 and a rotatable lid 15. The lid 15 rotates about a hinge 17 at one end of the base 12 to close on the base 12. A plastic insert 13 is secured to the base 12 and includes a central spindle 14 that holds the compact disk 24 by means of its central hole 25 which is inserted over the spindle 14 (shown in FIG. 2). The plastic insert 13 has a circular depressed area 16 or recess 16 in which compact disk 24 sits when secured by the spindle 14.

A CD label hub 21 and a concentric foam disk 23, or other flexible member 23, are attached to an interior surface of the lid 12 of the CD jewel case 11. The concentric flexible member 23 or foam disk 23 is used to hold the CD label 26 so that it is at an appropriate distance relative to the compact disk 24 when the lid 15 is closed on the base. The CD label hub 21 has a central opening 22 into which the spindle 14 sits when the lid 15 is closed to mate with the base 12. The central opening 22 in the CD label hub 21 is larger in diameter than the spindle 14 and there is no contact between them. The CD label hub 21 is sized so that the central opening 27 of the CD label 26 is secured by it (shown in FIG. 2).

To operate the device 10, and referring to FIG. 2, a compact disk 24 is secured in the plastic insert 13 with its central hole 25 secured by the spindle 14. A CD label 26 is pressed over the CD label hub 21 so that its back side touches the concentric foam disk 23 and its adhesive surface 28 is exposed. Referring to FIGS. 3 and 4, the lid 15 is closed, and the concentric foam disk 23 presses the adhesive surface 28 of the CD label 26 onto the surface of the compact disk 24, thus securing the label 26 to the compact disk 24. The lid 15 is pressed against the base 12 by applying hand pressure, for example, illustrated by the arrows in FIG. 4.

The jewel case 11 is then opened and the labeled compact disk 26 is removed, as is illustrated in FIG. 4.

Figure 6:
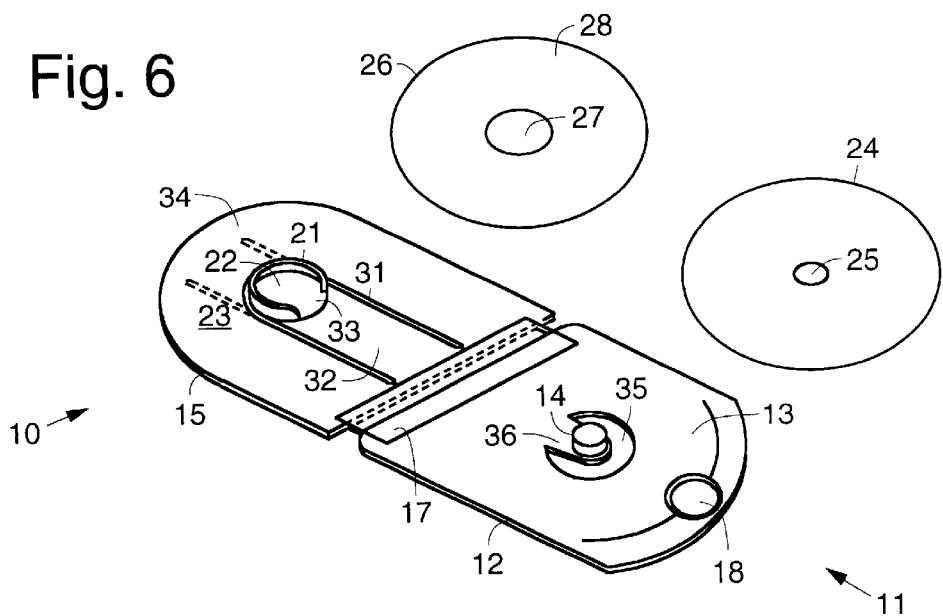
FIGS. 6–8 illustrate various views and operation of second and third exemplary embodiments of a compact disk labeling system in accordance with the principles of the present invention.
Figure 7:
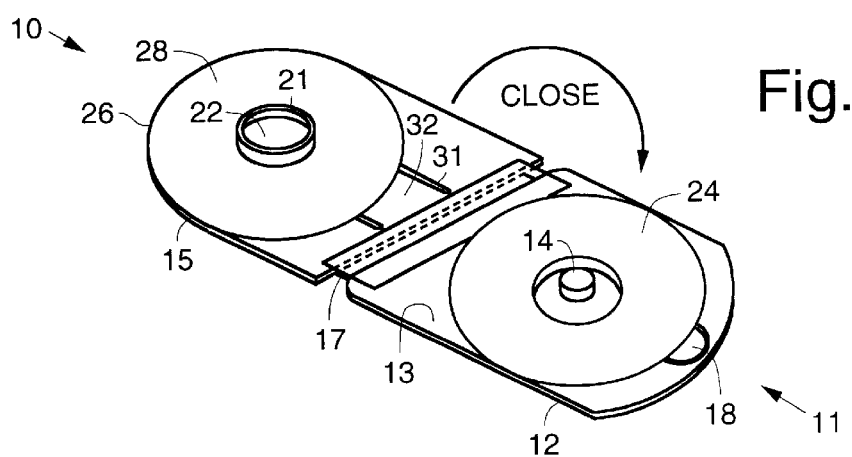
Figure 8:
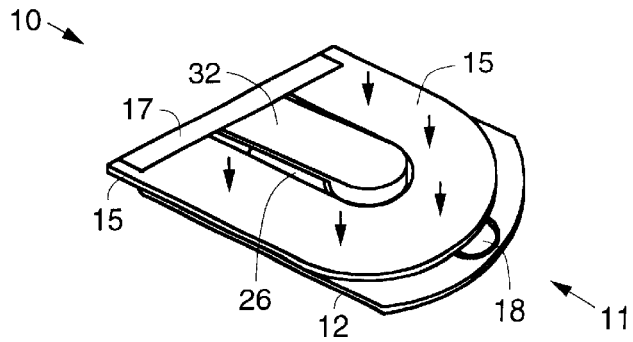

FIGS. 5–7 illustrate various views and operation of second and third exemplary embodiments of compact disk labeling systems 10 in accordance with the principles of the present invention. FIG. 6 shows an open second embodiment of the labeling system 10 and a compact disk (CD) 24 and CD label 26 that are used with it. FIG. 7 shows a third embodiment of the system 10 with the compact disk 24 and CD label 26 disposed in the labeling system 10 along with closing of the labeling system 10. FIG. 8 shows either of the labeling systems 10 shown in FIGS. 6 and 7 in a closed condition where the CD label 26 is secured to the compact disk 24.

The second embodiment of the compact disk labeling system 10 comprises a base 12 and a rotatable lid 15 attached to the base 12 by means of a living hinge 17 or other flexible or hinge member 17, for example. The lid 15 has a substantially flat surface 23 and has a U-shaped slot 31 extending away from the hinge 17. However, it is to be understood that the slot may be disposed in any direction, such as is illustrated by the dashed slot extending toward the upper left of the lid 15. Furthermore, the may have any form and is not limited to a U shape. The slot 31 forms an inner elongated tab section 32 and an outer section 34. A thin walled cylindrically-shaped CD label hub 21 having a portion 33 of its wall removed extends away from the surface of the inner elongated tab section 32 toward the base 12 when the lid 15 is closed on the base 12. A CD label 26 is held by the CD label hub 21 and inner elongated tab section 32 with its printed side lying against the surface 23 of the lid 15 and adhesive surface 28 exposed.

The base 12 has a substantially flat upper surface 13 and edgewalls 35 that extend away from the upper surface 13 to create a cavity under the base 12 when it sits on a flat surface. The upper surface 13 has a central circular opening 35 that aligns with the CD label hub 21 of the depressible member when the lid 15 is closed on the base 12. In the second embodiment of the system 10, a portion of the upper surface 13 of the base 12 is formed as a tab 36 that extends into the center of the central circular opening 35. A spindle 14 that holds a compact disk 24 is formed as part of the tab 36 and is aligned with the center of the cylindrically-shaped hub 21.

The CD label hub 21 extending from the inner elongated tab section 32 is sized to pass into the central circular opening 35 when the lid 15 is closed on the base 12 for storage purposes. The tab 36 of the base 12 fits in the removed portion 33 of the CD label hub 21 when the lid 15 is closed on the base 12 for storage purposes.

Referring to FIG. 7, it shows a third exemplary embodiment of a compact disk labeling system 10. In the third embodiment of the system 10, the cylindrically-shaped CD label hub 21 does not have any part of its wall removed and is hence fully cylindrical. Also, the central circular opening 35 is molded into the base and the spindle 14 protrudes from the center of the opening 35 to a distance that is slightly above the upper surface 13 of the base 12 to hold the compact disk 24.

To operate the compact disk labeling systems 10 shown in FIGS. 6 and 7, a compact disk 24 is disposed on the base 12 with its central hole 25 secured by the spindle 14. A CD label 26 is pressed over the CD label hub 21 so that its printed side lies against the flat surface 23 of the lid 15 and its adhesive surface 28 is exposed. The lid 15 is closed (illustrated by the curved arrow in FIG. 7) so that the CD label hub 21 touches the center of the compact disk 24 (illustrated in FIG. 8). The outer section 34 of the lid 15 is then fully closed on the base 12 (illustrated by the arrows in FIG. 8) to press the adhesive surface 28 of the CD label 26 onto the surface 23 of the compact disk 24, thus securing the label 26 to the compact disk 24. The labeled compact disk 24 is removed from the device 10 in a manner described with reference to FIG. 5.

The three embodiments of the compact disk labeling system 10 may be preferably molded as a single plastic component having the base 12 and lid 15 secured by means of a living hinge 17. In the first embodiment of the compact disk labeling system 10 the base 12, spindle 14, hinge 17, rotatable lid 15, label hub 21 and flexible member 23 may also be molded as single plastic component, with the flexible member 23 formed as a relatively thin walled portion whose thickness makes it flexible relative to the remainder of the lid 15.

Thus, improved compact disk labeling systems have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

Figure 9:
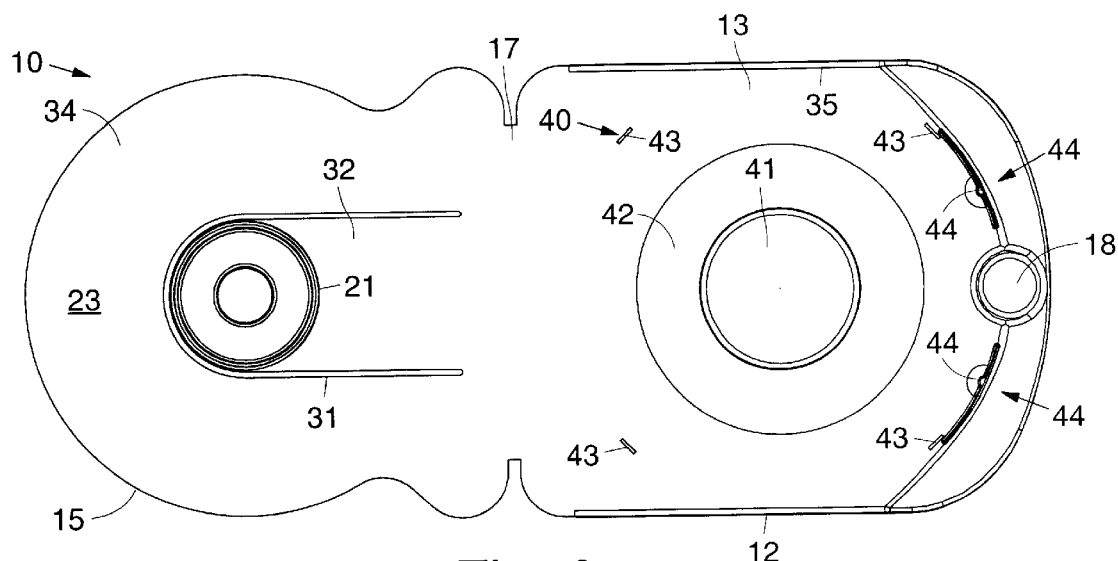
FIGS. 9–12 illustrate top, side, end and perspective views of a fourth exemplary embodiment of a compact disk labeling system in accordance with the principles of the present invention.
Figure 10:
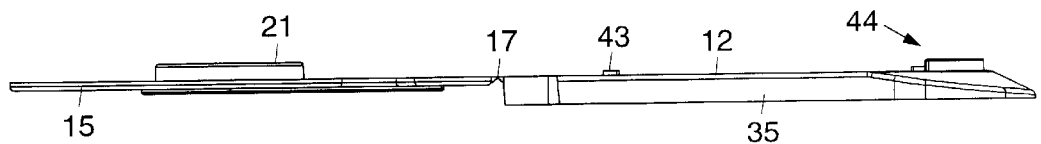
Figure 11:
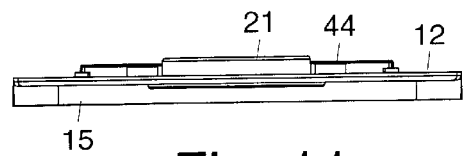
Figure 12:
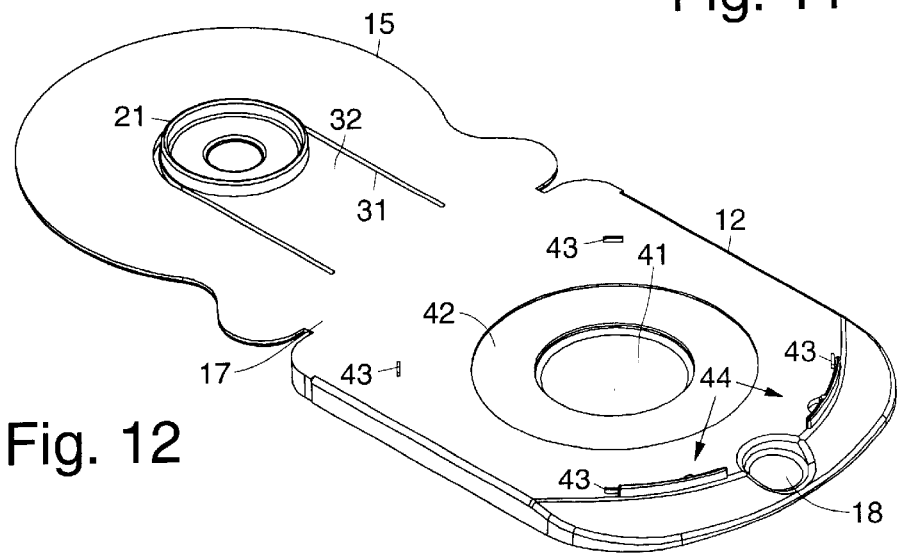

FIGS. 9–11 illustrate top, side and end views, respectively, of a fourth exemplary embodiment of a compact disk labeling system 10 in accordance with the principles of the present invention. FIG. 12 is a perspective view of the fourth embodiment of the compact disk labeling system 10.

The fourth embodiment of the compact disk labeling system 10 comprises a base 12 and a rotatable lid 15 attached to the base 12 by means of a living hinge 17 or other flexible or hinge member 17, for example. The lid 15 has a substantially flat surface 23 and has a U-shaped slot 31 extending away from the hinge 17. However, it is to be understood that the slot 31 may be disposed in any direction, and is not limited to a U shape, such as was discusses with regard to the other embodiments of the system 10. The slot 31 forms an inner elongated tab section 32 and an outer section 34. A thin walled cylindrically-shaped CD label hub 21 extends away from the surface of the inner elongated tab section 32 toward the base 12 when the lid 15 is closed on the base 12. A CD label 26 (FIG. 6) is held by the CD label hub 21 by way of its central hole 27 or opening 27 with its printed or printable side lying against the surface 23 of the lid 15 and adhesive surface 28 exposed.

The base 12 has a substantially flat upper surface 13 and edgewalls 35 that extend away from the upper surface 13 to create a cavity under the base 12 when it sits on a flat surface. The upper surface 13 has a central circular opening 41 that is substantially larger than the CD label hub 21. The CD label hub 21 extending from the inner elongated tab section 32 passes into the circular opening 41 when the lid 15 is closed on the base 12 without touching the outer diameter thereof.

The upper surface 13 of the base 12 comprises one or more outer edge holding mechanisms 40 for holding and centering the compact disk 24. In the exemplary embodiment, a portion of the upper surface 13 of the base 12 has a recess 42 formed therein whose outer diameter is sized to hold a mini compact disk. The diameter of the recess 42 for the mini compact disk is 3.144 inches.

In the exemplary embodiment, the outer edge holding mechanisms 40 comprise a plurality of bosses 43 or tabs 43 that protrude from the upper surface 13 of the base 12 that hold and center the compact disk 24 (FIG. 6) by means of its outer edge. It is to be understood, however, that a single circular lip or portions of a circular lip (not shown) may be formed to hold and center the compact disk 24 instead of the plurality of bosses 43 or tabs 43, in a manner similar to the function of the recess 42 used to hold and center the mini compact disk. The diameter of the inner edge of the bosses 43 or tabs 43, or the diameter of the circular lip (or portions thereof) if it is used, is 4.725 inches. Furthermore, the compact disk 24 may be held and centered by means of a recess that is similar to the recess 42 that may be used to hold and center the mini compact disk.

The base 12 comprises one or more locking devices 44 that each have a locking tab 45. The locking devices 44 extend away from the upper surface 13 and the locking tabs 45 secure the outer edge of the lid 15 when the lid 15 is closed on the base 12.

It is to be understood that the CD label hub 21 may take on various forms. For example, the CD label hub 21 may be a one piece circular projection, or a plurality of tabs disposed in a circular arrangement that hold and center the compact disk 24. Furthermore, the CD label hub 21 may be a cross or triangular shaped member whose outermost or peripheral edges hold and center the compact disk 24.

What is claimed is:

1. A compact disk labeling system for use in applying an adhesive label having a central hole to a compact disk having an outer edge and a central hole, comprising:

a compact disk case having a base and a rotatable lid that rotates about a hinge at one end of the base;

a label hub extending from an interior surface of the lid that holds the adhesive label by means of its central hole; and an outer edge holding mechanism disposed on an interior surface of the base that contacts the outer edge of the compact disk to prevent movement of the compact disk and center the compact disk relative to the adhesive label, and to register the label to the contact disk when the rotatable lid is rotated to contact the base.

2. The system recited in claim 1 wherein the outer edge holding mechanism comprises one or more protrusions extending from an interior surface of the base.

3. The system recited in claim 2 wherein the outer edge holding mechanism comprises a circular lip.

4. The system recited in claim 1 wherein the outer edge holding mechanism comprises a circular recess.

5. The system recited in claim 1 wherein the outer edge holding mechanism comprises portion of a circular recess.

6. The system recited in claim 1 further comprising a foam disk attached to an interior surface of the lid that is concentrically disposed around the label hub.

7. A compact disk labeling system for use in applying an adhesive label having a central hole to a compact disk having an outer edge and a central hole, comprising:

a base having a generally flat upper surface;

a rotatable lid attached to the base by means of a hinge that has a generally flat surface with an inner tab section and an outer section that are flexible relative to each other;

a cylindrically-shaped compact disk label hub that protrudes from the inner tab section and which holds the adhesive label by means of its central hole; and an outer edge holding mechanism formed on an interior surface of the base that contacts the outer edge of the compact disk to prevent movement of the compact disk and center the compact disk relative to the adhesive label, and to register the label to the contact disk when the rotatable lid is rotated to contact the base.

8. The system recited in claim 7 wherein the hinge comprises a living hinge.

9. The system recited in claim 8 which is molded as a single component.

10. The system recited in claim 7 wherein the outer edge holding mechanism comprises one or more protrusions extending from an interior surface of the base.

11. The system recited in claim 7 wherein the outer edge holding mechanism comprises a circular lip.

12. The system recited in claim 11 wherein the outer edge holding mechanism comprises a circular recess.

13. The system recited in claim 11 further comprising a foam disk attached to the interior surface of the lid that is concentrically disposed around the label hub.

* * * * *